A. F. LARSON.
CRANK SHAFT.
APPLICATION FILED JAN. 18, 1913.
1,194,042.
Patented Aug. 8, 1916.
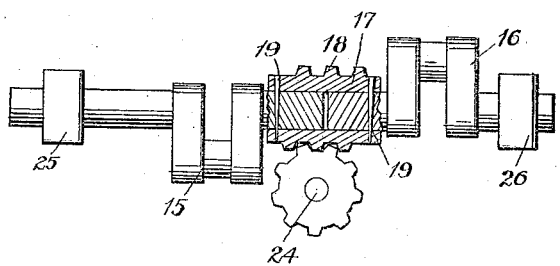
Witnesses:
Albin E. Ahlberg
Robert F. Bracke
Inventor
Axel F. Larson
By Lynn A. Williams
Attorney

UNITED STATES PATENT OFFICE.

AXEL F. LARSON, OF CHICAGO, ILLINOIS, ASSIGNOR TO MARQUETTE PIANO COMPANY, OF CHICAGO, ILLINOIS, A CORPORATION OF MICHIGAN.

CRANK-SHAFT.

1,194,042.        Specification of Letters Patent.        Patented Aug. 8, 1916.

Application filed January 18, 1913. Serial No. 742,842.

*To all whom it may concern:*

Be it known that I, AXEL F. LARSON, a citizen of the United States, residing at Chicago, in the county of Cook and State of Illinois, have invented a certain new and useful Improvement in Crank-Shafts, of which the following is a full, clear, concise, and exact description, reference being had to the accompanying drawings, forming a part of this specification.

My invention relates to crank shafts, and its object is to provide a crank shaft comprising two separate cranks and means for connecting said cranks, said means also serving as one of the elements of a gear train for transmitting power from or to the crank shaft.

In the drawing the crank shaft is illustrated partly in section and partly in elevation.

In the drawing, 15 and 16 represent the cranks, each crank being provided with an arm projecting into an integral hollow cylindrical member 17, the said cylindrical member having an external worm 18 formed integral therewith. Passing through the hollow cylindrical member 17 and the arms of the cranks which project into the hollow cylindrical member are pins 19. The tapered pins 19 rigidly fix the cranks to the cylindrical member 17 and the ends of said pins lie flush with the external surface of the member 17, and thus do not interfere with the pinion meshing with the worm formed on the hollow cylindrical member. The cranks 15 and 16 are journaled in bearings 25 and 26 as illustrated.

At 24 is illustrated a shaft disposed at right angles to the axis of the crank shaft, and mounted upon said shaft 24 is a pinion arranged to mesh with the worm of the member 17.

Attention may be called to the fact that the engaging surfaces of the worm 18 are disposed in close proximity to the crank shaft so any stress applied to the crank shaft sections due to the load carried by the pinion 24 is transmitted in a side thrust to the bearings for the shaft sections. This side thrust is parallel to the axis of the shaft and prevents the shaft from buckling or bending, as would be the case if an ordinary gear were employed in the place of the worm gear.

What I claim as new and desire to secure by Letters Patent of the United States is:

1. A crank shaft comprising a pair of cranks, bearings for the shaft, an integral hollow cylindrical member connecting said cranks, each of said cranks comprising an arm projecting into said hollow cylindrical member, and tapered pins passing through the cranks and cylindrical member to secure the same together, said hollow cylindrical member comprising an external worm, formed integral therewith, and disposed in close proximity to the axis of the crank shaft.

2. A crank shaft comprising a pair of cranks, bearings for the shaft, an integral hollow cylindrical member sleeved directly on the shaft and connecting said cranks, each of said cranks comprising an arm projecting into said hollow cylindrical member, means for connecting the cylindrical member to the cranks to secure the same together, said hollow cylindrical member comprising an external worm formed integral therewith and disposed in close proximity to the axis of the crank shaft.

3. In a device of the class described, the combination of a pair of shafts each provided with a crank arm, bearings for the shafts, a sleeve mounted directly on the shafts surrounding and connecting the inner ends thereof and a worm carried by the sleeve, the engaging surfaces of said worm being disposed in close proximity to the shafts.

4. In a device of the class described, the combination of a pair of shafts each provided with a crank arm, bearings for the shafts, a sleeve mounted directly on the shafts surrounding and connecting the inner ends thereof and a worm carried by the sleeve, the engaging surfaces of said worm being disposed in close proximity to the shafts, said shafts extending outwardly into the bearings disposed on the outside of the crank arms.

In witness whereof, I hereunto subscribe my name, this 10th day of January, 1913.

AXEL F. LARSON.

Witnesses:
     A. G. McCOBB,
     LESLIE W. FRICKE.

Copies of this patent may be obtained for five cents each, by addressing the "Commissioner of Patents, Washington, D. C."